United States Patent
Nam et al.

(10) Patent No.: US 12,057,912 B2
(45) Date of Patent: Aug. 6, 2024

(54) CROSS-DISCONTINUOUS RECEPTION GROUP CHANNEL STATE INFORMATION REPORTING

(71) Applicant: QUALCOMM Incorporated, San Diego, CA (US)

(72) Inventors: Wooseok Nam, San Diego, CA (US); Jelena Damnjanovic, Del Mar, CA (US); Linhai He, San Diego, CA (US); Tao Luo, San Diego, CA (US); Olufunmilola Omolade Awoniyi-Oteri, San Diego, CA (US); Juan Montojo, San Diego, CA (US); Iyab Issam Sakhnini, San Diego, CA (US)

( * ) Notice: Subject to any disclaimer, the term of this patent is extended or adjusted under 35 U.S.C. 154(b) by 0 days.

(21) Appl. No.: 18/348,428

(22) Filed: Jul. 7, 2023

(65) Prior Publication Data

US 2023/0353213 A1    Nov. 2, 2023

Related U.S. Application Data

(62) Division of application No. 17/211,604, filed on Mar. 24, 2021, now Pat. No. 11,728,865.
(Continued)

(51) Int. Cl.
*H04W 8/00* (2009.01)
*H04B 7/06* (2006.01)
(Continued)

(52) U.S. Cl.
CPC ......... *H04B 7/0626* (2013.01); *H04L 1/1819* (2013.01); *H04L 1/1896* (2013.01);
(Continued)

(58) Field of Classification Search
None
See application file for complete search history.

(56) References Cited

U.S. PATENT DOCUMENTS

| | | | |
|---|---|---|---|
| 2011/0019637 A1 | 1/2011 | Ojala et al. | |
| 2014/0105049 A1 | 4/2014 | Kim et al. | |

(Continued)

FOREIGN PATENT DOCUMENTS

| | | |
|---|---|---|
| WO | 2018107462 A1 | 6/2018 |
| WO | 2021159312 A1 | 8/2021 |

OTHER PUBLICATIONS

3GPP: "3rd Generation Partnership Project, Technical Specification Group Radio Access Network, NR, Physical Layer Procedures for Control (Release 16)", 3GPP Standard, Technical Specification, 3GPP TS 38.213, 3rd Generation Partnership Project, Mobile Competence Centre, 650, Route Des Lucioles, F-06921, Sophia-Antipolis, Cedex, France, vol. RAN WG1, No. V16.0.0, Dec. 2019, Jan. 14, 2020, XP051860806, pp. 1-146.

(Continued)

*Primary Examiner* — Abdelillah Elmejjarmi

(57) ABSTRACT

Various aspects of the present disclosure generally relate to wireless communication. In some aspects, a user equipment (UE) may determine whether a flag is enabled or is disabled, the flag indicating whether channel state information (CSI) associated with a secondary discontinuous reception (DRX) group is permitted to be transmitted outside of an active time associated with a primary DRX group. The UE may selectively transmit the CSI associated with the secondary DRX group in an uplink communication associated with the primary DRX group based at least in part on whether the flag is enabled or is disabled. Numerous other aspects are provided.

28 Claims, 7 Drawing Sheets

Related U.S. Application Data

(60) Provisional application No. 63/000,929, filed on Mar. 27, 2020.

(51) Int. Cl.
　　*H04L 1/1812*　　(2023.01)
　　*H04L 1/1867*　　(2023.01)
　　*H04W 8/24*　　(2009.01)
　　*H04W 72/21*　　(2023.01)
　　*H04W 76/28*　　(2018.01)

(52) U.S. Cl.
　　CPC ............ *H04W 8/24* (2013.01); *H04W 72/21* (2023.01); *H04W 76/28* (2018.02)

(56) References Cited

U.S. PATENT DOCUMENTS

| | | |
|---|---|---|
| 2019/0349120 A1 | 11/2019 | Cheng et al. |
| 2020/0045768 A1 | 2/2020 | He et al. |
| 2020/0383119 A1 | 12/2020 | Sun et al. |
| 2021/0306044 A1 | 9/2021 | Nam et al. |
| 2022/0225151 A1 | 7/2022 | Zhang et al. |
| 2022/0279518 A1 | 9/2022 | Lin et al. |

OTHER PUBLICATIONS

CATT: "Consideration on Aperiodic CSI with Secondary DRX", 3GPP TSG-RAN WG2 Meeting #113 electronic, 3GPP Draft, R2-2101243, 3rd Generation Partnership Project (3GPP), Mobile Competence Centre; 650, Route Des Lucioles; F-06921 Sophia-Antipolis Cedex; France, vol. RAN WG2, No. Electronic; Online, Jan. 25, 2021-Feb. 5, 2021, 2 Pages, Jan. 15, 2021 (Jan. 15, 2021), XP051974206, paragraph [02.2].

Ericsson: "Email Report [107bis#49] [NR TEI16] cDRX Enhancement for CA", 3GPP TSG-RAN2 Meeting #108, 3GPP Draft, R2-1915292, 3rd Generation Partnership Project (3GPP), Mobile Competence Centre; 650, Route Des Lucioles; F-06921 Sophia-Antipolis Cedex; France, vol. RAN WG2, No. Reno, USA; Nov. 18, 2019-Nov. 22, 2019, Nov. 12, 2019 (Nov. 12, 2019), pp. 1-20, XP051824768, p. 7-p. 8 p. 16-p. 20, Table of p. 9, row "Mediatek"; paragraph [0002], paragraph [0004].

Ericsson, et al., "Introduction of Secondary DRX Group 38.321," 3GPP Draft, 3GPP TSG-RAN2 Meeting #109-e Online, R2-2000347, 3rd Generation Partnership Project (3GPP), Mobile Competence Centre, 650, Route Des Lucioles, F-06921, Sophia-Antipolis Cedex, France, vol. RAN WG2. No. Online Feb. 14, 2020 (Feb. 14, 2020), XP051848958, 5 pages, p. 4, lines 21-24.

Ericsson, et al., "Introduction of Secondary DRX Group", 3GPP TSG-RAN2 Meeting #109-e, 3GPP Draft, R2-2000345, 3rd Generation Partnership Project (3GPP), Mobile Competence Centre; 650, Route Des Lucioles; F-06921 Sophia-Antipolis Cedex; France, vol. RAN WG2, No. Online, Feb. 14, 2020 (Feb. 14, 2020), pp. 1-5, XP051848956, paragraph [0004].

International Preliminary Report on Patentabilityz—PCT/US2021/070313—The International Bureau of WIPO—Geneva, Switzerland—Oct. 6, 2022.

International Search Report and Written Opinion—PCT/US2021/070313—ISA/EPO—Sep. 3, 2021.

OPPO: "Further Considerations on Secondary DRX Group", 3GPP TSG-RAN WG2 Meeting #109 Electronic, 3GPP Draft; R2-2000407, 3rd Generation Partnership Project (3GPP), vol. RAN WG2, No. Default_Value; Feb. 24, 2020-Mar. 6, 2020, pp. 1-6, Feb. 14, 2020 (Feb. 14, 2020), XP051849000.

Partial International Search Report—PCT/US2021/070313—ISA/EPO—Jun. 21, 2021.

CROSS-DISCONTINUOUS RECEPTION GROUP CHANNEL STATE INFORMATION REPORTING

CROSS-REFERENCE TO RELATED APPLICATION

This application is a divisional of U.S. patent application Ser. No. 17/211,604, filed Mar. 24, 2021, "CROSS-DISCONTINUOUS RECEPTION GROUP CHANNEL STATE INFORMATION REPORTING," which claims priority to U.S. Provisional Patent Application No. 63/000,929, filed on Mar. 27, 2020, entitled "CROSS-DISCONTINUOUS RECEPTION GROUP CHANNEL STATE INFORMATION REPORTING," the contents of which are incorporated herein by reference in their entireties.

FIELD OF THE DISCLOSURE

Aspects of the present disclosure generally relate to wireless communication and to techniques and apparatuses for cross-discontinuous reception (DRX) group channel state information (CSI) reporting.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication, performed by a user equipment, may include determining whether a flag is enabled or is disabled, the flag indicating whether channel state information (CSI) associated with a secondary discontinuous reception DRX group is permitted to be transmitted outside of an active time associated with a primary DRX group; and selectively transmitting the CSI associated with the secondary DRX group in an uplink communication associated with the primary DRX group based at least in part on whether the flag is enabled or is disabled.

In some aspects, a method of wireless communication, performed by a user equipment, may include determining that CSI associated with a secondary DRX group is to be multiplexed with uplink control information (UCI) outside of an active time associated with a primary DRX group; and transmitting an uplink communication in a physical uplink control channel (PUCCH) associated with the primary DRX group based at least in part on determining that the CSI is to be multiplexed with UCI outside of the active time associated with the primary DRX group, wherein the uplink communication includes at least the CSI associated with the secondary DRX group.

In some aspects, a user equipment (UE) for wireless communication may include a memory and one or more processors operatively coupled to the memory. The memory and the one or more processors may be configured to determine whether a flag is enabled or is disabled, the flag indicating whether CSI associated with a secondary DRX group is permitted to be transmitted outside of an active time associated with a primary DRX group; and selectively transmit the CSI associated with the secondary DRX group in an uplink communication associated with the primary DRX group based at least in part on whether the flag is enabled or is disabled.

In some aspects, a UE for wireless communication may include a memory and one or more processors operatively coupled to the memory. The memory and the one or more processors may be configured to determine that CSI associated with a secondary DRX group is to be multiplexed with UCI outside of an active time associated with a primary DRX group; and transmit an uplink communication in a PUCCH associated with the primary DRX group based at least in part on determining that the CSI is to be multiplexed with UCI outside of the active time associated with the primary DRX group, wherein the uplink communication includes at least the CSI associated with the secondary DRX group.

In some aspects, a non-transitory computer-readable medium may store one or more instructions for wireless communication. The one or more instructions, when executed by one or more processors of a UE, may cause the one or more processors to determine whether a flag is enabled or is disabled, the flag indicating whether CSI associated with a secondary DRX group is permitted to be transmitted outside of an active time associated with a primary DRX group; and selectively transmit the CSI associated with the secondary DRX group in an uplink communication associated with the primary DRX group based at least in part on whether the flag is enabled or is disabled.

In some aspects, a non-transitory computer-readable medium may store one or more instructions for wireless communication. The one or more instructions, when executed by one or more processors of a UE, may cause the one or more processors to determine that CSI associated with a secondary DRX group is to be multiplexed with UCI outside of an active time associated with a primary DRX group; and transmit an uplink communication in a PUCCH associated with the primary DRX group based at least in part on determining that the CSI is to be multiplexed with UCI outside of the active time associated with the primary DRX group, wherein the uplink communication includes at least the CSI associated with the secondary DRX group.

In some aspects, an apparatus for wireless communication may include means for determining whether a flag is enabled or is disabled, the flag indicating whether CSI associated with a secondary DRX group is permitted to be transmitted outside of an active time associated with a primary DRX group; and means for selectively transmitting the CSI associated with the secondary DRX group in an uplink communication associated with the primary DRX group based at least in part on whether the flag is enabled or is disabled.

In some aspects, an apparatus for wireless communication may include means for determining that CSI associated with a secondary DRX group is to be multiplexed with UCI outside of an active time associated with a primary DRX group; and means for transmitting an uplink communication in a PUCCH associated with the primary DRX group based at least in part on determining that the CSI is to be multiplexed with UCI outside of the active time associated with the primary DRX group, wherein the uplink communication includes at least the CSI associated with the secondary DRX group.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, or artificial intelligence-enabled devices). Aspects may be implemented in chip-level components, modular components, non-modular components, non-chip-level components, device-level components, or system-level components. Devices incorporating described aspects and features may include additional components and features for implementation and practice of claimed and described aspects. For example, transmission and reception of wireless signals may include a number of components for analog and digital purposes (e.g., hardware components including antenna, RF chains, power amplifiers, modulators, buffer, processor(s), interleaver, adders, or summers). It is intended that aspects described herein may be practiced in a wide variety of devices, components, systems, distributed arrangements, or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
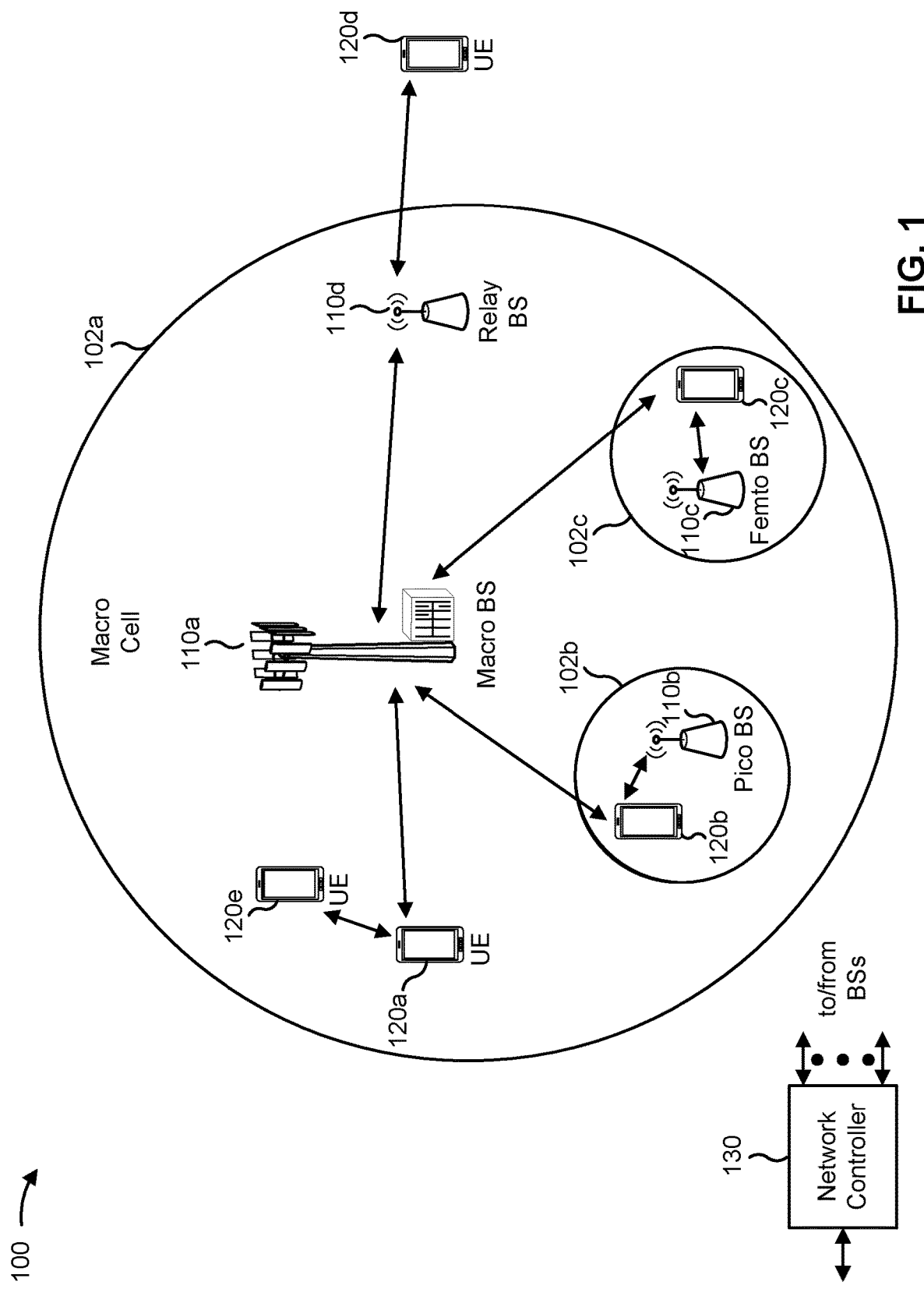
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (NR) network and/or an LTE network, among other examples. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
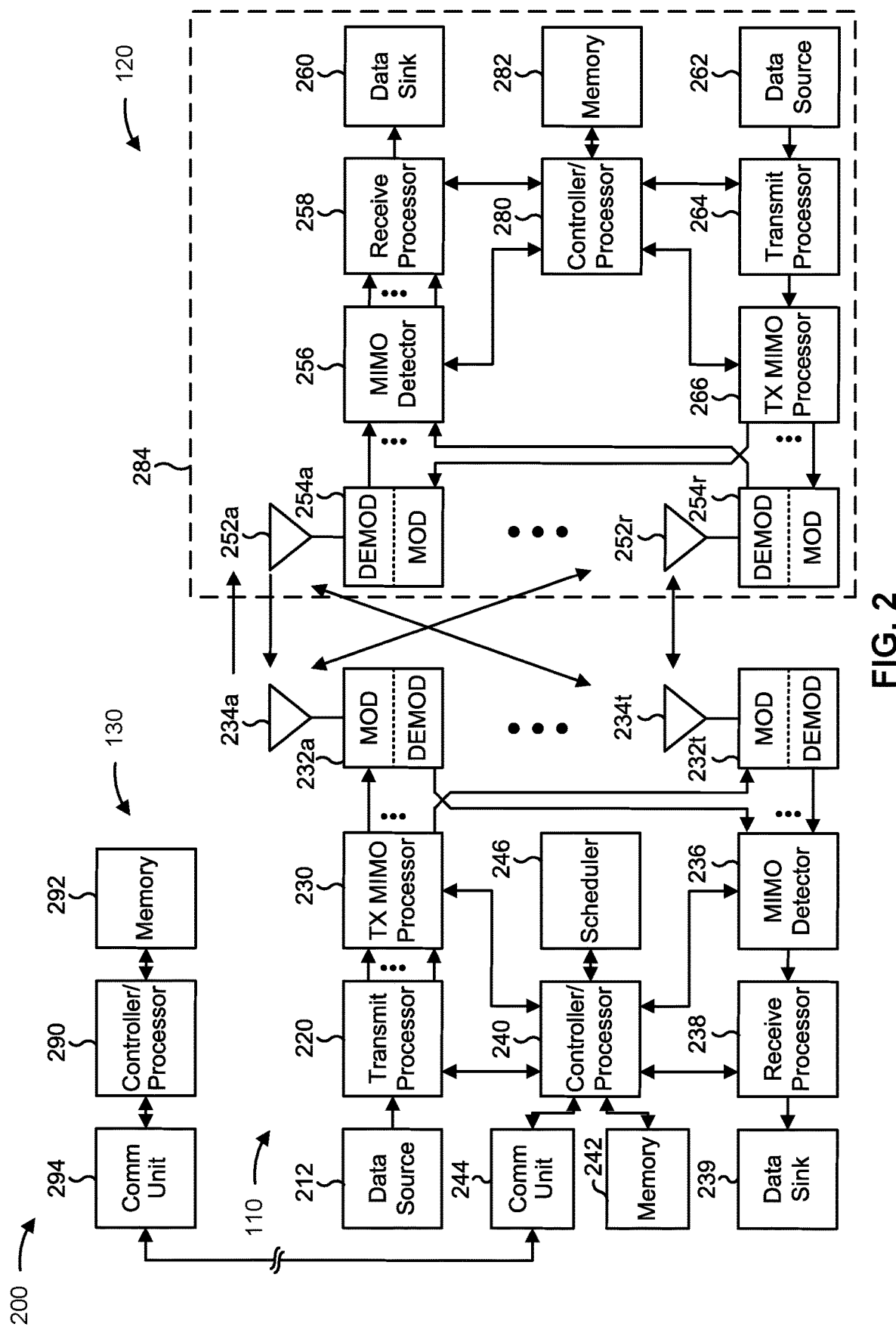
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254*a* through 254*r* (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein, for example, as described with reference to FIGS. 3A, 3B, 4, 5, or 6.

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein, for example, as described with reference to FIGS. 3A-3B, 4, 5 or 6.

Controller/processor 240 of base station 110, controller/processor 280 of UE 120, and/or any other component(s) of FIG. 2 may perform one or more techniques associated with cross-discontinuous reception (DRX) group channel state information (CSI) reporting, as described in more detail elsewhere herein. For example, controller/processor 240 of base station 110, controller/processor 280 of UE 120, and/or any other component(s) of FIG. 2 may perform or direct operations of, for example, process 500 of FIG. 5, process 600 of FIG. 6, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may perform or direct operations of, for example, process 500 of FIG. 5, process 600 of FIG. 6, and/or other processes as described herein. In some aspects, executing instructions may include running the instructions, converting the instructions, compiling the instructions, and/or interpreting the instructions, among other examples.

In some aspects, UE 120 may include means for determining whether a flag is enabled or is disabled, the flag indicating whether CSI associated with a secondary DRX group is permitted to be transmitted outside of an active time associated with a primary DRX group; means for selectively transmitting the CSI associated with the secondary DRX group in an uplink communication associated with the primary DRX group based at least in part on whether the flag is enabled or is disabled; and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

In some aspects, UE 120 may include means for determining that CSI associated with a secondary DRX group is to be multiplexed with uplink control information (UCI) outside of an active time associated with a primary DRX group; means for transmitting an uplink communication in a physical uplink control channel (PUCCH) associated with the primary DRX group based at least in part on determining that the CSI is to be multiplexed with UCI outside of the active time associated with the primary DRX group, wherein the uplink communication includes at least the CSI associated with the secondary DRX group; and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

A DRX configuration is typically defined per medium access control (MAC) entity. The DRX configuration may include, for example, information associated with one or more types of DRX cycle (e.g., short and/or long), information associated with an on-duration timer (e.g., drx-onDurationTimer), information associated with an inactivity timer (e.g., drx-InactivityTimer), or the like. Generally, DRX configurations are defined using subcarrier spacing (SCS) independent values (e.g., a parameter of a DRX configuration can be defined in terms of milliseconds rather than a number of slots).

In some wireless communication systems, a single DRX configuration may be configured. However, in some cases, the use of a single DRX configuration may be undesirable. For example, in a carrier aggregation scenario in an NR system, component carriers used for wireless communications can be in different frequency ranges and have different numerologies. As a particular example, a first set of component carriers used for wireless communications may be in FR1, while a second set of component carriers used for wireless communications may be in FR2. In such a case, power consumption characteristics and/or latency/throughput characteristics can vary across the component carriers.

Thus, when a single DRX configuration is used across these component carriers having different characteristics, a power saving versus scheduling flexibility (latency/throughput) tradeoff across the component carriers is restricted.

To address this issue, in some wireless communication systems, another DRX configuration can be configured (i.e., multiple DRX configurations can be configured). For example, a primary DRX configuration and a secondary DRX configuration can be configured. In such a case, one or more parameters may differ between the primary and secondary DRX configurations. For example, inactivity and on-duration timers associated with the primary DRX configuration may be different from (e.g., longer than) inactivity and on-duration timers associated with the secondary DRX configuration. In a scenario in which component carriers are FR1 and FR2, the primary DRX configuration can be used for component carriers in FR1 and the secondary DRX configuration can be used for component carriers in FR2 in order to alleviate the above-described restriction on the power saving versus scheduling flexibility tradeoff.

A set of component carriers (e.g., in FR1) that uses a primary DRX configuration may be referred to as a primary DRX group (PDG). The primary DRX group may, for example, be power efficient and may be used for control data and relatively low-rate/latency-tolerant traffic. A set of component carriers (e.g., in FR2) that uses a secondary DRX configuration may be referred to as a secondary DRX group (secondary DRX group). The secondary DRX group may, for example, have high power consumption and may be used for high-rate/urgent traffic. In such a scenario, it is desirable that an active time associated with the secondary DRX group is shorter than an active time associated with the primary DRX group (e.g., for the purpose of power saving). For power efficient operation, the secondary DRX group may be used (e.g., stay in DRX active time) only when there is demand, and may remain in DRX mode (e.g., outside active time) otherwise. This can in some instances be achieved by configuring timers associated with the secondary DRX group (e.g., a drx-onDurationTimer and a drx-InactivityTimer associated with the secondary DRX configuration) to be shorter than those associated with the primary DRX group (e.g., a drx-onDurationTimer and a drx-InactivityTimer associated with the primary DRX configuration).

However, if DRX processes of the primary DRX group and the secondary DRX group are completely independent, an active time associated with the secondary DRX group is not always guaranteed to be shorter than an active time associated with the primary DRX group. For example, even though the timers used by the secondary DRX group (e.g., the timers associated with the secondary DRX configuration) may be shorter than those used by the primary DRX group (e.g., the timers associated with the primary DRX configuration), extension of an active time associated with a given DRX group (e.g., by starting/restarting of a drx-InactivityTimer) depends on traffic in the given DRX group. Since the primary DRX group may be used for signals such as paging, system information, slot-format indication, wake-up/secondary cell dormancy indication, and/or the like, as well as UCI such as CSI (e.g., when a single PUCCH configuration is to be used for all DRX groups), it is desirable to ensure that the primary DRX group is in active time at all times during which the secondary DRX group is in active time.

If a primary DRX group is not in active time at all times during which a secondary DRX group is in active time, reporting of some information, such as CSI associated with the secondary DRX group, may be impacted, which results in secondary DRX group resources being wasted. For example, a primary DRX group and a secondary DRX group may be in a same PUCCH group (e.g., such that the two DRX groups are to use a single PUCCH configuration that indicates PUCCH resources on a cell in the primary DRX group). If the primary DRX group is in active time at all times during which the secondary DRX group is in active time, CSI determined based on a measurement at a previous measurement occasion (e.g., a measurement occasion within a most recent active time of the secondary DRX group) can be sent over the PUCCH in the primary DRX group. Notably, in this case, a measurement occasion associated with the secondary DRX group that is outside of the active time associated with the secondary DRX group may not be used (i.e., no measurement may be performed). Conversely, if the primary DRX group is not in active time at a given time during which the secondary DRX group is in active time, even though a measurement associated with determining CSI can be performed on the secondary DRX group during the active time associated with the secondary DRX group, the CSI cannot be sent on the primary DRX group (e.g., since the primary DRX group is outside of active time), meaning that resources used for performing the measurement and determining the CSI associated with the secondary DRX group are wasted.

Some aspects described herein provide techniques and apparatuses for cross-DRX group CSI reporting. In some aspects, a UE may determine whether a flag is enabled or is disabled, where the flag indicates whether CSI associated with a secondary DRX group is permitted to be transmitted outside of an active time associated with a primary DRX group. In some aspects, based at least in part on whether the flag is enabled or disabled, the UE may selectively transmit the CSI associated with the secondary DRX group in an uplink communication associated with the primary DRX group. Additional details are described below.

In some aspects, to further improve power efficiency, it may be desirable to multiplex CSI associated with a secondary DRX group with other UCI when reporting the CSI outside of an active time associated with a primary DRX group. In some aspects, a UE may determine that the CSI associated with the secondary DRX group is to be multiplexed with UCI outside of an active time associated with the primary DRX group, and may transmit an uplink communication in a PUCCH associated with the primary DRX group based at least in part on this determination. Here, the uplink communication may include at least the CSI associated with the secondary DRX group. Additional details are described below.

Figure 3A:
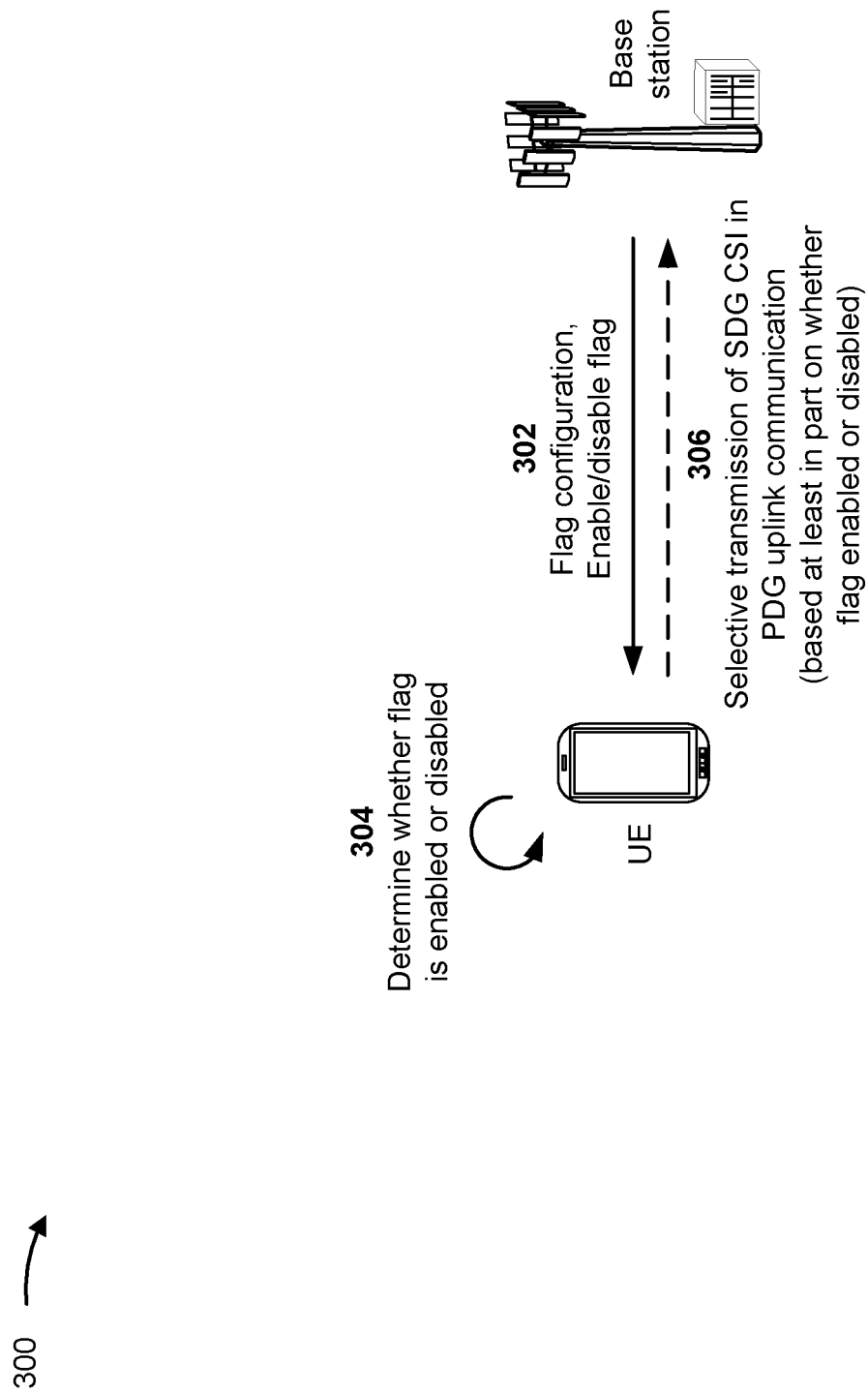
FIGS. 3A, 3B, and 4 are diagrams illustrating examples associated with cross-discontinuous reception (DRX) group channel state information (CSI) reporting, in accordance with the present disclosure.
Figure 3B:
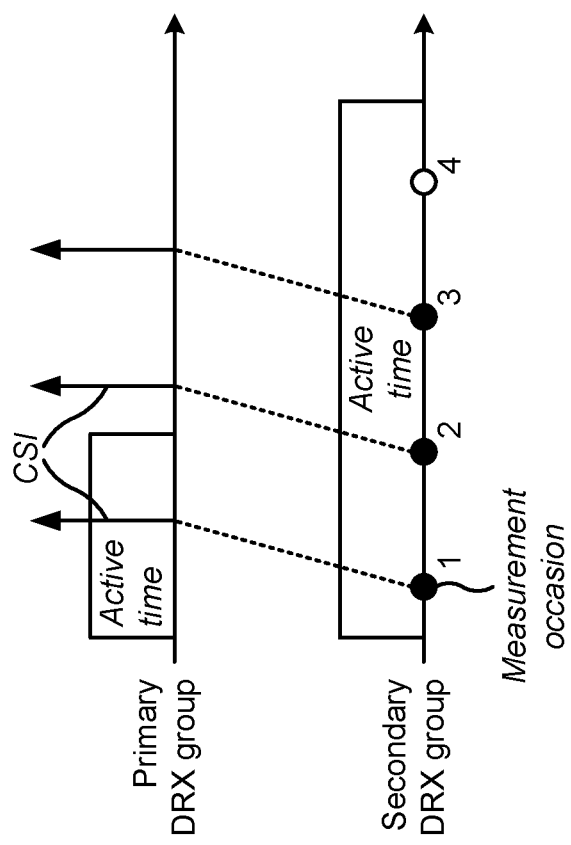

FIGS. 3A and 3B are diagrams illustrating examples associated with cross-DRX group CSI reporting, in accordance with the present disclosure. In the examples associated with FIGS. 3A and 3B, a UE (e.g., a UE 120) is configured to use a primary DRX group (e.g., one or more component carriers in FR1) associated with a primary DRX configuration and a secondary DRX group (e.g., one or more component carriers in FR2) associated with a secondary DRX configuration. Further, the primary DRX group and the secondary DRX group are associated with a single PUCCH configuration (e.g., a PUCCH configuration that indicates resources on a cell in the primary DRX group that are to be used for providing uplink control information).

As shown in FIG. 3A by reference 302, the UE may receive (e.g., from a base station 110) a configuration associated with a flag and/or an indication to enable or to disable the flag. In some aspects, the flag is an indicator that signals whether information associated with the secondary DRX group is permitted to be transmitted at a particular time. In some aspects, the flag may be a one bit indicator. As an example, in some aspects, the flag may be an indicator that signals whether CSI (e.g., periodic CSI, semi-persistent CSI, or the like) associated with the secondary DRX group is permitted to be transmitted outside of an active time associated with the primary DRX group. Here, when the flag is enabled (e.g., when a bit associated with the flag is set to a value of 1), the flag may indicate that CSI associated with the secondary DRX group is permitted to be transmitted outside of an active time associated with the primary DRX group. Conversely, when the flag is disabled (e.g., when the bit associated with the flag is set to a value of 0), the flag may indicate that CSI associated with the secondary DRX group is not permitted to be transmitted outside of an active time associated with the primary DRX group.

In some aspects, the flag may be configured per UE (e.g., a single flag may be used for all secondary DRX groups configured on the UE). Alternatively, in some aspects, the flag may be configured per DRX group (e.g., such that different flags are used for different secondary DRX groups configured on the UE).

In some aspects, the flag may be configured based at least in part on UE capability information provided by the UE (e.g., capability information indicating that the UE supports use of the flag). In some aspects, the flag may be configured based at least in part on a request transmitted by the UE (e.g., a request through assistance information feedback).

In some aspects, the use of the flag may be conditional to the single PUCCH configuration. That is, in some aspects, the use of the flag to determine whether CSI associated with the secondary DRX group is permitted to be transmitted outside of an active time associated with the primary DRX group may be conditioned on the primary DRX group and the secondary DRX group being associated with a single PUCCH configuration (e.g., such that CSI associated with the secondary DRX group is to be provided in PUCCH resources in the primary DRX group).

In some aspects, the UE may receive the configuration of the flag or the indication associated with enabling or disabling the flag via, for example, radio resource control (RRC) signaling, a MAC control element (MAC-CE), downlink control information (DCI), or the like.

As shown by reference 304, the UE may determine whether the flag is enabled or is disabled. In some aspects, the UE may determine whether the flag is enabled or disabled at or before a measurement occasion associated with the secondary DRX group. Additionally, in some aspects, the UE may determine whether the flag is enabled or disabled after a determination of whether an uplink communication occasion (e.g., a PUCCH occasion) associated with reporting CSI determined based at least in part on a measurement at the measurement is within an active time of the primary DRX group. Further, in some aspects, the UE may determine whether the flag is enabled or disabled after a determination of whether a primary DRX group is in an active time or is within a threshold amount of time from an end of an active time.

For example, at a measurement occasion with the secondary DRX group, the UE may determine whether an uplink communication occasion (e.g., a PUCCH occasion) associated with reporting CSI determined based at least in part on a measurement at the measurement occasion is within an active time of the primary DRX group (or is within a threshold amount of time from an end of an active time). Here, if the uplink communication occasion associated with the measurement occasion is outside of an active time associated with the primary DRX group (i.e., if the primary DRX group will not be in an active time at the uplink communication) and if the uplink communication occasion associated with the measurement occasion is within a threshold amount of time from an end of an active time associated with the primary DRX group, then the UE may determine whether the flag is enabled or is disabled (e.g., since in this case CSI would need to be provided after the end of the active time associated with the primary DRX group). In some aspects, the UE may determine whether the flag is enabled or is disabled based at least in part on an indication from the base station, as described above.

Continuing with the above example, if the flag is enabled (e.g., indicating that CSI associated with the secondary DRX group can be provided outside of an active time associated with the primary DRX group), then the UE may proceed with performing a measurement and determining CSI associated with the secondary DRX group. Conversely, if the flag is disabled (e.g., indicating that CSI associated with the secondary DRX group cannot be provided outside of an active time associated with the primary DRX group), then the UE may refrain from performing a measurement and determining CSI associated with the secondary DRX group, thereby conserving secondary DRX group resources. In a case in which the uplink communication occasion associated with the measurement occasion is within an active time associated with the primary DRX group (i.e., if the primary DRX group is in an active time), then the UE may skip the determination of whether the flag is enabled or is disabled (e.g., since in this case the CSI would be provided during the active time associated with the primary DRX group) and may proceed with performing a measurement and determining CSI associated with the secondary DRX group.

As shown by reference 306, the UE may selectively transmit CSI associated with the secondary DRX group in an uplink communication (e.g., a PUCCH communication) associated with the primary DRX group based at least in part on whether the flag is enabled or is disabled.

In some aspects, when the flag is enabled, selectively transmitting the CSI associated with the secondary DRX group in the uplink communication associated with the primary DRX group includes transmitting the CSI in the uplink communication. In some aspects, the CSI associated with the secondary DRX group may be transmitted during an active time associated with the secondary DRX group. That is, when the flag is enabled, CSI reporting (e.g., in a PUCCH) is allowed on the primary DRX group (i.e., on a PUCCH carrier) outside of an active time of the primary DRX group if the secondary DRX group is in an active time (i.e., PUCCH occasions for CSI reporting can be extended outside of active time). In some aspects, in association with transmitting the CSI in the uplink communication (e.g., a PUCCH communication), the UE may perform a wake-up associated with the primary DRX group at a PUCCH occasion. Notably, outside of an active time associated with the primary DRX group, the UE need not monitor a physical downlink control channel (PDCCH) associated with the primary DRX group, and instead may remain in a sleep mode or a low power mode.

In some aspects, when the flag is disabled, selectively transmitting the CSI associated with the secondary DRX group in the uplink communication associated with the primary DRX group may include skipping a measurement occasion associated with determining the CSI, as described above, and/or refraining from transmitting the CSI (e.g., if the CSI was already determined) in the uplink communication.

In some aspects, the UE may selectively transmit the CSI in the uplink communication further based at least in part on a timer. The timer may indicate, for example, a maximum length of time after the active time associated with the primary DRX group that the CSI is permitted to be reported in the uplink communication. For example, the UE may start the timer at an end of an active time associated with the primary DRX group. Next, the UE may determine that that flag is enabled, as described above. The UE may then determine whether the timer has expired (e.g., whether a threshold amount of time from the end of the active time associated with the primary DRX group has lapsed). In this example, if the timer has not expired, then the UE may determine the CSI associated with the secondary DRX group and transmit the CSI in the uplink communication associated with the primary DRX group. Conversely, if the timer has expired, then the UE may skip a measurement occasion associated with determining the CSI or refrain from transmitting the CSI in the uplink communication associated with the primary DRX group. In such a case, the UE may also disable the flag (e.g., without an indication from the base station).

In some aspects, the UE may selectively transmit the CSI in the uplink communication further based at least in part on a threshold. The threshold may indicate, for example, a maximum number of times that CSI is permitted to be reported outside of the active time associated with the primary DRX group. For example, the UE may maintain a counter that indicates a number of secondary DRX group CSI transmissions outside of an active time associated with the primary DRX group. Next, the UE may determine that that flag is enabled, as described above. The UE may then determine whether the counter has reached a threshold (e.g., whether the counter indicates that the maximum number of secondary DRX group CSI transmissions outside of a primary DRX group active time has been reached). In this example, if the counter has not reached the threshold, then the UE may determine the CSI associated with the secondary DRX group and transmit the CSI in the uplink communication associated with the primary DRX group. Conversely, if the counter has reached the threshold, then the UE may skip a measurement occasion associated with determining the CSI or refrain from transmitting the CSI in the uplink communication associated with the primary DRX group. In such a case, the UE may also disable the flag (e.g., without an indication from the base station). In some aspects, a timer and/or a threshold can be used to limit a number of secondary DRX group CSI transmissions outside of an active time associated with the primary DRX group, thereby conserving UE resources.

In some aspects, when the UE transmits the CSI associated with the secondary DRX group in the uplink communication associated with the primary DRX group, the UE may multiplex the CSI with UCI in the uplink communication. For example, the UE may multiplex the CSI associated with the secondary DRX group with hybrid automatic repeat request acknowledgment (HARQ-ACK) feedback, with CSI associated with the primary DRX group, or with one or more other types of UCI. Additional details regarding multiplexing CSI associated with the secondary DRX group with UCI are provided below.

FIG. 3B is a diagram illustrating an example associated with transmitting CSI associated with a secondary DRX group outside of an active time associated with a primary DRX group. At a first measurement occasion associated with the secondary DRX group (indicated in FIG. 3B by the black circle labeled "1"), the UE may determine that an uplink communication occasion (e.g., a PUCCH occasion) associated with reporting CSI determined based at least in part on a measurement at the first measurement occasion is within an active time associated with the primary DRX group. Here, the UE may skip the determination of whether the flag is enabled or is disabled (e.g., since in this case the CSI would be provided during the active time associated with the primary DRX group), may perform a first measurement and determine first CSI associated with the secondary DRX group, and provide the first CSI in an uplink communication associated with the primary DRX group, as indicated in FIG. 3B.

At a second measurement occasion associated with the secondary DRX group (indicated in FIG. 3B by the black circle labeled "2"), the UE may determine that an uplink communication occasion associated with reporting CSI determined based at least in part on a measurement at the second measurement occasion is outside of an active time associated with the primary DRX group, but is within the threshold amount of time from the end of the active time associated with the primary DRX group. Here, the UE may determine whether the flag is enabled or is disabled (e.g., since in this case the CSI would be provided outside of the active time associated with the primary DRX group). In this example, the UE determines that the flag is enabled. As further shown, the UE may perform a second measurement and determine second CSI associated with the secondary DRX group, and provide the second CSI in an uplink communication associated with the primary DRX group. Here, a wake-up is performed at a PUCCH occasion in association with transmitting the second CSI in the uplink communication associated with the primary DRX group.

At a third measurement occasion associated with the secondary DRX group (indicated in FIG. 3B by the black circle labeled "3"), the UE may determine that the third measurement occasion is outside of an active time associated with the primary DRX group. Thus, the UE may determine whether the flag is enabled or is disabled (e.g., since in this case the CSI would be provided outside of the active time associated with the primary DRX group). In this example, the UE determines that the flag is enabled. As further shown, the UE may perform a third measurement and determine third CSI associated with the secondary DRX group, and provide the third CSI in an uplink communication associated with the primary DRX group. Here, a wake-up is performed at a PUCCH occasion in association with transmitting the third CSI in the uplink communication associated with the primary DRX group.

At a fourth measurement occasion associated with the secondary DRX group (indicated in FIG. 3B by the white circle labeled "4"), the UE may determine that the fourth measurement occasion is outside of an active time associated with the primary DRX group. Thus, the UE may determine whether the flag is enabled or is disabled (e.g., since in this case the CSI would be provided outside of the active time associated with the primary DRX group). In this example, the UE determines that the flag is enabled. Assume for the purposes of the fourth measurement occasion that, at the end of the active time associated with the primary DRX group, the UE started a timer associated with a maximum length of time after the active time that the CSI is permitted to be reported in the primary DRX group. Here, the UE may determine whether the timer has expired. In this example, as indicated in FIG. 3B, the UE determines that the timer has expired, and skips the fourth measurement occasion (e.g., the UE refrains from performing a measurement associated with determining the fourth CSI). The UE may also disable the flag based at least in part on the expiration of the timer.

As indicated above, FIGS. 3A and 3B are provided as examples. Other examples may differ from what is described with respect to FIGS. 3A and 3B.

Figure 4:
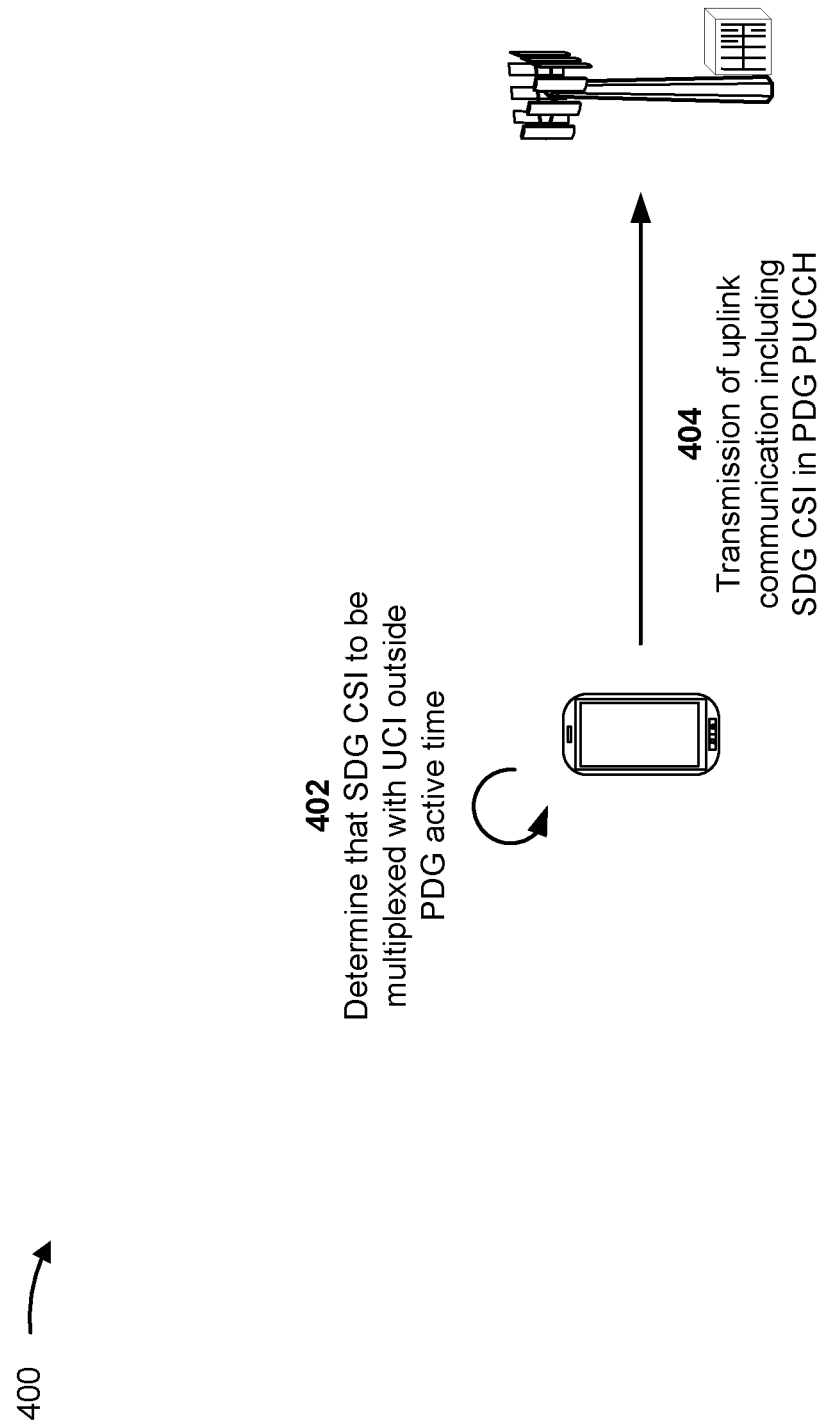

FIG. 4 is a diagram illustrating an example associated with cross-DRX group CSI reporting, in accordance with the present disclosure. In the example associated with FIG. 4, a UE (e.g., a UE 120) is configured to use a primary DRX group (e.g., one or more component carriers in FR1) associated with a primary DRX configuration and a secondary DRX group (e.g., one or more component carriers in FR2) associated with a secondary DRX configuration. Further, the primary DRX group and the secondary DRX group are associated with a single PUCCH configuration (e.g., a PUCCH configuration that indicates resources in the primary DRX group that are to be used for providing uplink control information).

As shown in FIG. 4 by reference 402, the UE may determine that CSI associated with the secondary DRX group is to be multiplexed with UCI outside of an active time associated with the primary DRX group. In some aspects, the UE may be configured such that the UE is required to multiplex CSI with UCI outside of an active time associated with the primary DRX group (e.g., rather than being up to UE implementation).

As shown by reference 404, the UE may transmit an uplink communication in a PUCCH associated with the primary DRX group based at least in part on determining that the CSI is to be multiplexed with UCI outside of the active time associated with the primary DRX group. Here, the uplink communication includes at least the CSI associated with the secondary DRX group. In some aspects, the uplink communication may be transmitted during an active time associated with the secondary DRX group. Thus, in some aspects, CSI associated with the secondary DRX group can be reported if there is other overlapping UCI outside of an active time associated with the primary DRX group and during an active time associated with the secondary DRX group (regardless of whether a flag associated with providing secondary DRX group CSI outside of an active time associated with the primary DRX group).

In some aspects, the CSI associated with the secondary DRX group is multiplexed with the UCI in the uplink communication. In some aspects, the UCI with which the CSI associated with the secondary DRX group is multiplexed may include HARQ-ACK feedback.

Additionally, or alternatively, the UCI with which the CSI associated with the secondary DRX group is multiplexed may include CSI associated with the primary DRX group. In such a case, the CSI associated with the primary DRX group may be CSI determined based at least in part on a most recent measurement during an active time associated with the primary DRX group.

In some aspects, the UE may selectively multiplex the CSI associated with the secondary DRX group with the CSI associated with the primary DRX group in the uplink communication. For example, since the UE does not measure CSI on the primary DRX group outside of an active time associated with the primary DRX group, the UE may be permitted to omit primary DRX group CSI from the uplink communication outside of the active time associated with the primary DRX group. However, there can be potential misalignment of DRX timers between the UE and the base station. For example, the base station may believe the primary DRX group to be in an active time and, therefore, may expect primary DRX group CSI from the UE. However, the UE may actually be outside of an active time associated with the primary DRX group and, therefore, may not provide primary DRX group CSI in the uplink communication. In such a case, due to the DRX timer misalignment, the base station may fail to decode the uplink communication (e.g., since the base station expects primary DRX group CSI but the UE does not provide primary DRX group CSI). To address this issue, the UE may in some aspects be configured or indicated to always include primary DRX group CSI (e.g., CSI determined based at least in part on a most recent measurement during an active time associated with the primary DRX group) in the uplink communication. Here, the primary DRX group CSI is multiplexed with the secondary DRX group CSI in the uplink communication, and the base station can successfully decode the uplink communication even in the case of a DRX timer misalignment. Alternatively, to address the DRX timer misalignment issue, the UE may in some aspects be configured or indicated (e.g., by the base station) to omit primary DRX group CSI from the uplink communication and report only secondary DRX group CSI. In this case, the base station may perform blind decoding under two hypotheses: (1) that primary DRX group CSI is multiplexed with secondary DRX group CSI in the uplink communication, and (2) that primary DRX group CSI is not multiplexed with secondary DRX group CSI in the uplink communication. Thus, the base station can successfully decode the uplink communication even when primary DRX group CSI is not multiplexed with the secondary DRX group CSI.

Notably, HARQ-ACK feedback and primary DRX group CSI are provided as examples of UCI and, in some aspects, the UCI with which the CSI associated with the secondary DRX group is multiplexed may include one or more other types of UCI.

As indicated above, FIG. 4 is provided as an example. Other examples may differ from what is described with respect to FIG. 4.

Figure 5:
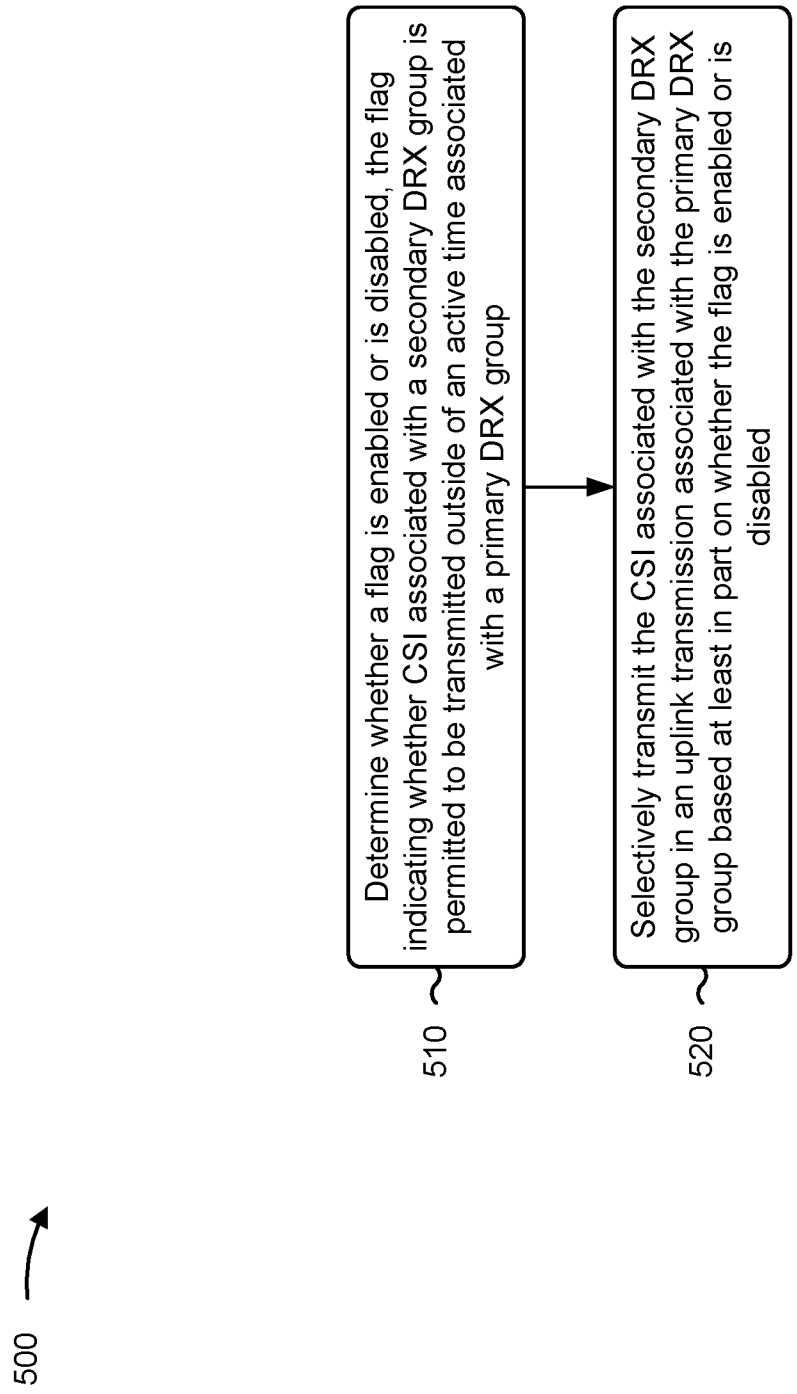
FIG. 5 is a diagram illustrating an example process performed, for example, by a user equipment, in accordance with the present disclosure.

FIG. 5 is a diagram illustrating an example process 500 performed, for example, by a UE, in accordance with the present disclosure. Example process 500 is an example where the UE (e.g., UE 120 and/or the like) performs operations associated with cross-DRX group CSI reporting.

As shown in FIG. 5, in some aspects, process 500 may include determining whether a flag is enabled or is disabled, the flag indicating whether CSI associated with a secondary DRX group is permitted to be transmitted outside of an active time associated with a primary DRX group (block 510). For example, the UE (e.g., using receive processor 258, transmit processor 264, controller/processor 280, memory 282, and/or the like) may determine whether a flag is enabled or is disabled, the flag indicating whether CSI associated with a secondary DRX group is permitted to be transmitted outside of an active time associated with a primary DRX group, as described above.

As further shown in FIG. 5, in some aspects, process 500 may include selectively transmitting the CSI associated with the secondary DRX group in an uplink communication associated with the primary DRX group based at least in part on whether the flag is enabled or is disabled (block 520). For example, the UE (e.g., using receive processor 258, transmit processor 264, controller/processor 280, memory 282, and/or the like) may selectively transmit the CSI associated with the secondary DRX group in an uplink communication associated with the primary DRX group based at least in part on whether the flag is enabled or is disabled, as described above.

Process 500 may include additional aspects, such as any single aspect or any combination of aspects described below and/or in connection with one or more other processes described elsewhere herein.

In a first aspect, the uplink communication comprises a PUCCH, and the primary DRX group and the secondary DRX group are associated with a single PUCCH configuration.

In a second aspect, alone or in combination with the first aspect, a configuration of the flag is at least one of: on a per-UE basis, or on a per-DRX group basis.

In a third aspect, alone or in combination with one or more of the first and second aspects, a configuration of the flag or an indication associated with enabling or disabling the flag is received via at least one of: radio resource control signaling, a medium access control control element, or downlink control information.

In a fourth aspect, alone or in combination with one or more of the first through third aspects, the flag is configured on the UE based at least in part on UE capability information provided by the UE.

In a fifth aspect, alone or in combination with one or more of the first through fourth aspects, the flag is configured on the UE based at least in part on a UE request transmitted by the UE.

In a sixth aspect, alone or in combination with one or more of the first through fifth aspects, when the flag is enabled, selectively transmitting the CSI associated with the secondary DRX group in the uplink communication associated with the primary DRX group includes transmitting the CSI in the uplink communication based at least in part on determining that the secondary DRX group is in an active time, the CSI being transmitted during an active time associated with the secondary DRX group.

In a seventh aspect, alone or in combination with one or more of the first through sixth aspects, a wake-up is performed at a PUCCH occasion in association with transmitting the CSI in the uplink communication.

In an eighth aspect, alone or in combination with one or more of the first through seventh aspects, when the flag is disabled, selectively transmitting the CSI associated with the secondary DRX group in the uplink communication associated with the primary DRX group includes at least one of: skipping a measurement occasion associated with determining the CSI, or refraining from transmitting the CSI in the uplink communication.

In a ninth aspect, alone or in combination with one or more of the first through eighth aspects, the CSI is selectively transmitted in the uplink communication further based at least in part on a timer that indicates a maximum length of time after the active time associated with the primary DRX group that the CSI is permitted to be reported in the uplink communication.

In a tenth aspect, alone or in combination with one or more of the first through ninth aspects, the CSI is selectively transmitted in the uplink communication based at least in part on a threshold that indicates a maximum number of times that CSI is permitted to be reported outside of the active time associated with the primary DRX group.

In an eleventh aspect, alone or in combination with one or more of the first through tenth aspects, the CSI associated with the secondary DRX group is multiplexed with UCI.

In a twelfth aspect, alone or in combination with one or more of the first through eleventh aspects, the UCI includes at least one of: hybrid automatic repeat request acknowledgment feedback, or CSI associated with the primary DRX group.

Although FIG. 5 shows example blocks of process 500, in some aspects, process 500 may include additional blocks, fewer blocks, different blocks, or differently arranged blocks than those depicted in FIG. 5. Additionally, or alternatively, two or more of the blocks of process 500 may be performed in parallel.

Figure 6:
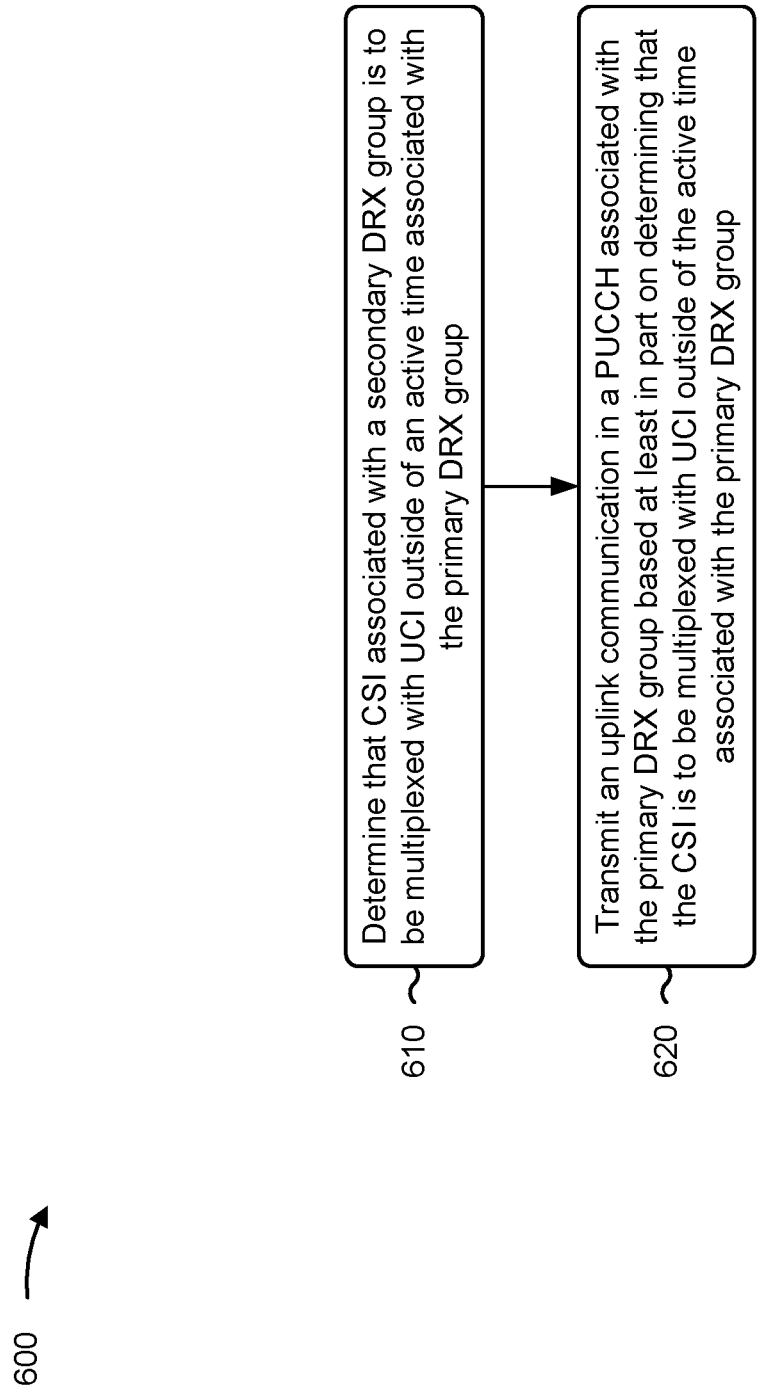
FIG. 6 is a diagram illustrating an example process performed, for example, by a user equipment, in accordance with the present disclosure.

FIG. 6 is a diagram illustrating an example process 600 performed, for example, by a UE, in accordance with the present disclosure. Example process 600 is an example where the UE (e.g., UE 120 and/or the like) performs operations associated with cross-DRX group CSI reporting.

As shown in FIG. 6, in some aspects, process 600 may include determining that CSI associated with a secondary DRX group is to be multiplexed with UCI outside of an active time associated with a primary DRX group (block 610). For example, the UE (e.g., using receive processor 258, transmit processor 264, controller/processor 280, memory 282, and/or the like) may determine that CSI associated with a secondary DRX group is to be multiplexed with UCI outside of an active time associated with a primary DRX group, as described above.

As further shown in FIG. 6, in some aspects, process 600 may include transmitting an uplink communication in a PUCCH associated with the primary DRX group based at least in part on determining that the CSI is to be multiplexed with UCI outside of the active time associated with the primary DRX group (block 620). For example, the UE (e.g., using receive processor 258, transmit processor 264, controller/processor 280, memory 282, and/or the like) may transmit an uplink communication in a PUCCH associated with the primary DRX group based at least in part on determining that the CSI is to be multiplexed with UCI outside of the active time associated with the primary DRX group, as described above. In some aspects, the uplink communication includes at least the CSI associated with the secondary DRX group.

Process 600 may include additional aspects, such as any single aspect or any combination of aspects described below and/or in connection with one or more other processes described elsewhere herein.

In a first aspect, the uplink communication is transmitted during an active time associated with the secondary DRX group.

In a second aspect, alone or in combination with the first aspect, the CSI associated with the secondary DRX group is multiplexed with UCI in the uplink communication.

In a third aspect, alone or in combination with one or more of the first and second aspects, the UCI in the uplink communication includes hybrid automatic repeat request acknowledgment feedback.

In a fourth aspect, alone or in combination with one or more of the first through third aspects, the UCI in the uplink communication includes CSI associated with the primary DRX group.

In a fifth aspect, alone or in combination with one or more of the first through fourth aspects, the CSI associated with the primary DRX group is associated with a most recent measurement during the active time associated with the primary DRX group.

In a sixth aspect, alone or in combination with one or more of the first through fifth aspects, process 600 includes selectively multiplexing the CSI associated with the secondary DRX group with CSI associated with the primary DRX group in the uplink communication.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

The following provides an overview of some Aspects of the present disclosure:

Aspect 1: A method of wireless communication performed by a user equipment (UE), comprising: determining whether a flag is enabled or is disabled, the flag indicating whether channel state information (CSI) associated with a secondary discontinuous reception (DRX) group is permitted to be transmitted outside of an active time associated with a primary DRX group; and selectively transmitting the CSI associated with the secondary DRX group in an uplink communication associated with the primary DRX group based at least in part on whether the flag is enabled or is disabled.

Aspect 2: The method of Aspect 1, wherein the uplink communication comprises a physical uplink control channel (PUCCH), and the primary DRX group and the secondary DRX group are associated with a single PUCCH configuration.

Aspect 3: The method of any of Aspects 1-2, wherein a configuration of the flag is at least one of: on a per-UE basis, or on a per-DRX group basis.

Aspect 4: The method of any of Aspects 1-3, wherein a configuration of the flag or an indication associated with enabling or disabling the flag is received via at least one of: radio resource control signaling, a medium access control control element, or downlink control information.

Aspect 5: The method of any of Aspects 1-4, wherein the flag is configured on the UE based at least in part on UE capability information provided by the UE.

Aspect 6: The method of any of Aspects 1-5, wherein the flag is configured on the UE based at least in part on a UE request transmitted by the UE.

Aspect 7: The method of any of Aspects 1-6, wherein, when the flag is enabled, selectively transmitting the CSI associated with the secondary DRX group in the uplink communication associated with the primary DRX group includes transmitting the CSI in the uplink communication based at least in part on determining that the secondary DRX group is in an active time, wherein the CSI is transmitted during an active time associated with the secondary DRX group.

Aspect 8: The method of Aspect 7, wherein a wake-up is performed at a physical uplink control channel occasion in association with transmitting the CSI in the uplink communication.

Aspect 9: The method of any of Aspects 1-8, wherein, when the flag is disabled, selectively transmitting the CSI associated with the secondary DRX group in the uplink communication associated with the primary DRX group includes at least one of: skipping a measurement occasion associated with determining the CSI, or refraining from transmitting the CSI in the uplink communication.

Aspect 10: The method of any of Aspects 1-9, wherein the CSI is selectively transmitted in the uplink communication further based at least in part on a timer that indicates a maximum length of time after the active time associated with the primary DRX group that the CSI is permitted to be reported in the uplink communication.

Aspect 11: The method of any of Aspects 1-10, wherein the CSI is selectively transmitted in the uplink communication further based at least in part on a threshold that indicates a maximum number of times that CSI is permitted to be reported outside of the active time associated with the primary DRX group.

Aspect 12: The method of any of Aspects 1-11, wherein the CSI associated with the secondary DRX group is multiplexed with uplink control information (UCI).

Aspect 13: The method of Aspect 12, wherein the UCI includes at least one of: hybrid automatic repeat request acknowledgment feedback, or CSI associated with the primary DRX group.

Aspect 14: A method of wireless communication performed by a user equipment (UE), comprising: determining that channel state information (CSI) associated with a secondary discontinuous reception (DRX) group is to be multiplexed with uplink control information (UCI) outside of an active time associated with a primary DRX group; and transmitting an uplink communication in a physical uplink control channel (PUCCH) associated with the primary DRX group based at least in part on determining that the CSI is to be multiplexed with UCI outside of the active time associated with the primary DRX group, wherein the uplink communication includes at least the CSI associated with the secondary DRX group.

Aspect 15: The method of Aspect 14, wherein the uplink communication is transmitted during an active time associated with the secondary DRX group.

Aspect 16: The method of any of Aspects 14-15, wherein the CSI associated with the secondary DRX group is multiplexed with UCI in the uplink communication.

Aspect 17: The method of Aspect 16, wherein the UCI in the uplink communication includes hybrid automatic repeat request acknowledgment feedback.

Aspect 18: The method of any of Aspects 16-17, wherein the UCI in the uplink communication includes CSI associated with the primary DRX group.

Aspect 19: The method of Aspect 18, wherein the CSI associated with the primary DRX group is associated with a most recent measurement during the active time associated with the primary DRX group.

Aspect 20: The method of any of Aspects 14-19, further comprising: selectively multiplexing the CSI associated with the secondary DRX group with CSI associated with the primary DRX group in the uplink communication.

Aspect 21: An apparatus for wireless communication at a device, comprising a processor; memory coupled with the processor; and instructions stored in the memory and executable by the processor to cause the apparatus to perform the method of one or more Aspects of Aspects 1-13.

Aspect 22: A device for wireless communication, comprising a memory and one or more processors coupled to the memory, the memory and the one or more processors configured to perform the method of one or more Aspects of Aspects 1-13.

Aspect 23: An apparatus for wireless communication, comprising at least one means for performing the method of one or more Aspects of Aspects 1-13.

Aspect 24: A non-transitory computer-readable medium storing code for wireless communication, the code comprising instructions executable by a processor to perform the method of one or more Aspects of Aspects 1-13.

Aspect 25: A non-transitory computer-readable medium storing a set of instructions for wireless communication, the set of instructions comprising one or more instructions that, when executed by one or more processors of a device, cause the device to perform the method of one or more Aspects of Aspects 1-13.

Aspect 26: An apparatus for wireless communication at a device, comprising a processor; memory coupled with the processor; and instructions stored in the memory and executable by the processor to cause the apparatus to perform the method of one or more Aspects of Aspects 14-20.

Aspect 27: A device for wireless communication, comprising a memory and one or more processors coupled to the memory, the memory and the one or more processors configured to perform the method of one or more Aspects of Aspects 14-20.

Aspect 28: An apparatus for wireless communication, comprising at least one means for performing the method of one or more Aspects of Aspects 14-20.

Aspect 29: A non-transitory computer-readable medium storing code for wireless communication, the code comprising instructions executable by a processor to perform the method of one or more Aspects of Aspects 14-20.

Aspect 30: A non-transitory computer-readable medium storing a set of instructions for wireless communication, the set of instructions comprising one or more instructions that, when executed by one or more processors of a device, cause the device to perform the method of one or more Aspects of Aspects 14-20.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method of wireless communication performed by a user equipment (UE), comprising:
    determining that channel state information (CSI) associated with a secondary discontinuous reception (DRX) group is to be multiplexed with uplink control information (UCI) outside of an active time associated with a primary DRX group; and
    transmitting an uplink communication in a physical uplink control channel (PUCCH) associated with the primary DRX group based at least in part on determining that the CSI is to be multiplexed with UCI outside of the active time associated with the primary DRX group, wherein the uplink communication includes at least the CSI associated with the secondary DRX group.

2. The method of claim 1, wherein the uplink communication is transmitted during an active time associated with the secondary DRX group.

3. The method of claim 1, wherein the CSI associated with the secondary DRX group is multiplexed with UCI in the uplink communication.

4. The method of claim 3, wherein the UCI in the uplink communication includes hybrid automatic repeat request acknowledgment feedback.

5. The method of claim 3, wherein the UCI in the uplink communication includes CSI associated with the primary DRX group.

6. The method of claim 5, wherein the CSI associated with the primary DRX group is associated with a most recent measurement during the active time associated with the primary DRX group.

7. The method of claim 1, further comprising:
    selectively multiplexing the CSI associated with the secondary DRX group with CSI associated with the primary DRX group in the uplink communication.

8. A non-transitory computer-readable medium storing a set of instructions for wireless communication, the set of instructions comprising:

one or more instructions that, when executed by one or more processors of a user equipment (UE), cause the UE to:

determine that channel state information (CSI) associated with a secondary discontinuous reception (DRX) group is to be multiplexed with uplink control information (UCI) outside of an active time associated with a primary DRX group; and transmit an uplink communication in a physical uplink control channel (PUCCH) associated with the primary DRX group based at least in part on determining that the CSI is to be multiplexed with UCI outside of the active time associated with the primary DRX group, wherein the uplink communication includes at least the CSI associated with the secondary DRX group.

9. The non-transitory computer-readable medium of claim 8, wherein the uplink communication is transmitted during an active time associated with the secondary DRX group.

10. The non-transitory computer-readable medium of claim 8, wherein the CSI associated with the secondary DRX group is multiplexed with UCI in the uplink communication.

11. The non-transitory computer-readable medium of claim 10, wherein the UCI in the uplink communication includes hybrid automatic repeat request acknowledgment feedback.

12. The non-transitory computer-readable medium of claim 10, wherein the UCI in the uplink communication includes CSI associated with the primary DRX group.

13. The non-transitory computer-readable medium of claim 12, wherein the CSI associated with the primary DRX group is associated with a most recent measurement during the active time associated with the primary DRX group.

14. The non-transitory computer-readable medium of claim 8, wherein the one or more instructions further cause the UE to:

selectively multiplex the CSI associated with the secondary DRX group with CSI associated with the primary DRX group in the uplink communication.

15. A user equipment (UE) for wireless communication, comprising:

one or more memories; and one or more processors, coupled to the one or more memories, configured to:

determine that channel state information (CSI) associated with a secondary discontinuous reception (DRX) group is to be multiplexed with uplink control information (UCI) outside of an active time associated with a primary DRX group; and transmit an uplink communication in a physical uplink control channel (PUCCH) associated with the primary DRX group based at least in part on determining that the CSI is to be multiplexed with UCI outside of the active time associated with the primary DRX group, wherein the uplink communication includes at least the CSI associated with the secondary DRX group.

16. The UE of claim 15, wherein the uplink communication is transmitted during an active time associated with the secondary DRX group.

17. The UE of claim 15, wherein the CSI associated with the secondary DRX group is multiplexed with UCI in the uplink communication.

18. The UE of claim 17, wherein the UCI in the uplink communication includes hybrid automatic repeat request acknowledgment feedback.

19. The UE of claim 17, wherein the UCI in the uplink communication includes CSI associated with the primary DRX group.

20. The UE of claim 19, wherein the CSI associated with the primary DRX group is associated with a most recent measurement during the active time associated with the primary DRX group.

21. The UE of claim 15, wherein the one or more processors are further configured to:

selectively multiplex the CSI associated with the secondary DRX group with CSI associated with the primary DRX group in the uplink communication.

22. An apparatus for wireless communication, comprising:

means for determining that channel state information (CSI) associated with a secondary discontinuous reception (DRX) group is to be multiplexed with uplink control information (UCI) outside of an active time associated with a primary DRX group; and means for transmitting an uplink communication in a physical uplink control channel (PUCCH) associated with the primary DRX group based at least in part on determining that the CSI is to be multiplexed with UCI outside of the active time associated with the primary DRX group, wherein the uplink communication includes at least the CSI associated with the secondary DRX group.

23. The apparatus of claim 22, wherein the uplink communication is transmitted during an active time associated with the secondary DRX group.

24. The apparatus of claim 22, wherein the CSI associated with the secondary DRX group is multiplexed with UCI in the uplink communication.

25. The apparatus of claim 24, wherein the UCI in the uplink communication includes hybrid automatic repeat request acknowledgment feedback.

26. The apparatus of claim 24, wherein the UCI in the uplink communication includes CSI associated with the primary DRX group.

27. The apparatus of claim 26, wherein the CSI associated with the primary DRX group is associated with a most recent measurement during the active time associated with the primary DRX group.

28. The apparatus of claim 22, further comprising:

means for selectively multiplexing the CSI associated with the secondary DRX group with CSI associated with the primary DRX group in the uplink communication.

* * * * *